(12) United States Patent
Soejima et al.

(10) Patent No.: US 8,922,789 B2
(45) Date of Patent: Dec. 30, 2014

(54) DISPLACEMENT MEASURING DEVICE AND DISPLACEMENT MEASURING METHOD

(71) Applicants: Fuji Jukogyo Kabushiki Kaisha, Tokyo (JP); The University of Tokyo, Tokyo (JP)

(72) Inventors: Hideki Soejima, Tokyo (JP); Yoji Okabe, Tokyo (JP); Qi Wu, Tokyo (JP); Koji Omichi, Sakura (JP); Ryujiro Nomura, Sakura (JP)

(73) Assignees: Fuji Jukogyo Kabushiki Kaisha, Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 13/959,076

(22) Filed: Aug. 5, 2013

(65) Prior Publication Data
US 2014/0218751 A1  Aug. 7, 2014

(30) Foreign Application Priority Data
Feb. 5, 2013 (JP) .................................. 2013-20928

(51) Int. Cl.
*G01B 11/14* (2006.01)
*G01B 11/02* (2006.01)

(52) U.S. Cl.
CPC ..................................... *G01B 11/02* (2013.01)
USPC .......................................... 356/614; 356/622

(58) Field of Classification Search
CPC ............... G01L 1/246; G01M 11/083; G01N 2291/02827; G01N 29/043; G01N 29/14; G01N 29/2418; G02B 2006/12107; G02B 2006/12109; G02B 2006/12138; G02B 6/02095; G02B 6/02138; G02B 6/02147; G02B 6/02152

USPC .......... 356/614–617, 620–623, 32–35.5, 73.1; 702/42, 34
See application file for complete search history.

(56) References Cited

U.S. PATENT DOCUMENTS 6,373,632 B1    4/2002   Flanders

FOREIGN PATENT DOCUMENTS

| JP | 2007-232371 A | 9/2007 |
| JP | 2008-046036 A | 2/2008 |
| JP | 2010-112867 A | 5/2010 |

OTHER PUBLICATIONS

Yoji Okabe, et al., "Evaluation of debonding progress in composite bonded structures using ultrasonic waves received in fiber Bragg grating sensors", Smart Mater. Struct., 2007, vol. 16, No. 4, pp. 1370-1378.

*Primary Examiner* — Tri T Ton
(74) *Attorney, Agent, or Firm* — Smith, Gambrell & Russell LLP

(57) ABSTRACT

Displacement measuring device with light irradiation system, first and second FBGs and detecting system. The first FBG has first transmittance distribution or first reflectance distribution. The second FBG has second transmittance distribution or second reflectance distribution. The detecting system detects light passed through the first and second FBGs of which at least one of the first transmittance distribution and the second transmittance distribution changes in a wavelength direction with a change amount different from that of the other, according to a displacement amount of an object, or amplitude of the light passed through the first and the second FBGs of which at least one of the first reflectance distribution and the second reflectance distribution changes in the wavelength direction with a change amount different from that of the other, according to the displacement amount of the object, and acquires an index to indicate the displacement amount based on the amplitude.

10 Claims, 11 Drawing Sheets

DISPLACEMENT MEASURING DEVICE AND DISPLACEMENT MEASURING METHOD

CROSS-REFERENCE TO RELATED APPLICATIONS

The present application claims priority from Japanese Patent Application No. 2013-20928 filed on Feb. 5, 2013, the entire contents of which are hereby incorporated by reference.

TECHNICAL FIELD

Embodiments of the present invention relate to a displacement measuring device and a displacement measuring method.

BACKGROUND

A technique to measure physical quantity using a fiber Bragg grating (FBG) has been known. For example, a system to search damage of composite material used for the material of aircraft using FBG and an arrayed waveguide grating (AWG) has been proposed (e.g. see Japanese Unexamined Patent Application Publication No. 2007-232371). A device to detect vibration or an elastic wave using FBG has also been proposed (see Japanese Unexamined Patent Application Publication No. 2010-112867, Japanese Unexamined Patent Application Publication No. 2008-046036 and Y. Okabe, J. Kuwahara, K. Natori, N. Takeda, T. Ogisu, S. Kojima, and S. Komatsuzaki, "Evaluation of Debonding Progress in Composite Bonded Structures Using Ultrasonic Waves Received in Fiber Bragg Grating Sensors", Smart Mater. Struct., Vol. 16, No. 4, pp. 1370-1378, (2007)). Particularly in the field of development material for aircraft, applying FBG to measuring strain is anticipated.

In the case of a conventional micro-displacement measuring device using FBG, electric noise must be removed by equalizing and filtering a detection signal in order to secure the signal to noise ratio (SNR). However in order to equalize a detection signal, measurement must be performed for a number of times required for equalization. This makes the measuring time long. Further, if filtering is performed using a low pass filter (LPF) or a high pass filter (HPF) to remove noise, useful data may be removed as well.

Further, depending on the measurement principle of a micro-displacement measuring device, an expensive device, such as a Fabry-Perot filter, is required. In particular, a wavelength variable filter, such as the Fabry-Perot filter, requires a mechanism to mechanically drive an optical element. This leads to a further increase in manufacturing cost. Furthermore, the wavelength variable filter has an optical element driving unit, which makes it difficult to measure an object that is subject to vibration, including an aircraft, a windmill and a bridge.

SUMMARY OF THE INVENTION

It is an object of the present invention to provide a displacement measuring device and a displacement measuring method that allow measuring displacement of an object using a simple configuration.

It is another object of the present invention to provide a displacement measuring device and a displacement measuring method that allow measuring displacement of an object with higher sensitivity.

A displacement measuring device according to an embodiment of the present invention includes an irradiation system, a first fiber Bragg grating, a second fiber Bragg grating and a detecting system. The irradiation system irradiates irradiation light. The first fiber Bragg grating has first transmittance distribution or first reflectance distribution with respect to a wavelength of transmitted light or reflected light. The second fiber Bragg grating has second transmittance distribution or second reflectance distribution with respect to a wavelength of transmitted light or reflected light. The detecting system detects amplitude of the irradiation light that has passed through the first fiber Bragg grating and the second fiber Bragg grating of which at least one of the first transmittance distribution and the second transmittance distribution changes in a wavelength direction with a change amount different from that of the other, according to a displacement amount of an object, or amplitude of the irradiation light that has passed through the first fiber Bragg grating and the second fiber Bragg grating of which at least one of the first reflectance distribution and the second reflectance distribution changes in the wavelength direction with a change amount different from that of the other, according to the displacement amount of the object, and acquires an index to indicate the displacement amount based on the amplitude that changes according to the change amount of at least one of the first transmittance distribution and the second transmittance distribution, or the change amount of at least one of the first reflectance distribution and the second reflectance distribution.

A displacement measuring device according to an embodiment of the present invention includes an irradiation system, an optical system and a detecting system. The irradiation system irradiates irradiation light. The optical system includes at least a phase-shifted fiber Bragg grating of which transmittance distribution or reflectance distribution with respect to a wavelength of transmitted light or reflected light changes according to a displacement amount of an object. The detecting system detects amplitude of the irradiation light that has passed through the optical system, and acquires an index to indicate the displacement amount based on the amplitude that changes according to a change amount of the transmittance distribution or the reflectance distribution.

A displacement measuring method according to an embodiment of the present invention includes: a step of irradiating irradiation light onto a first fiber Bragg grating that has first transmittance distribution or first reflectance distribution with respect to a wavelength of transmitted light, and a second fiber Bragg grating that has second transmittance distribution or second reflectance distribution with respect to a wavelength of transmitted light; and a step of detecting amplitude of the irradiation light that has passed through the first fiber Bragg grating and the second fiber Bragg grating of which at least one of the first transmittance distribution and the second transmittance distribution changes in a wavelength direction with a change amount different from that of the other, according to a displacement amount of an object, or amplitude of the irradiation light that has passed through the first fiber Bragg grating and the second fiber Bragg grating of which at least one of the first reflectance distribution and the second reflectance distribution changes in the wavelength direction with a change amount different from that of the other, according to the displacement amount of the object, and acquiring an index to indicate the displacement amount based on the amplitude that changes according to the change amount of at least one of the first transmittance distribution and the second transmittance distribution, or the change amount of at least one of the first reflectance distribution and the second reflectance distribution.

DETAILED DESCRIPTION

A displacement measuring device and a displacement measuring method according to embodiments of the present invention will now be described with reference to the accompanying drawings.

First Embodiment

Configuration and Functions

Figure 1:
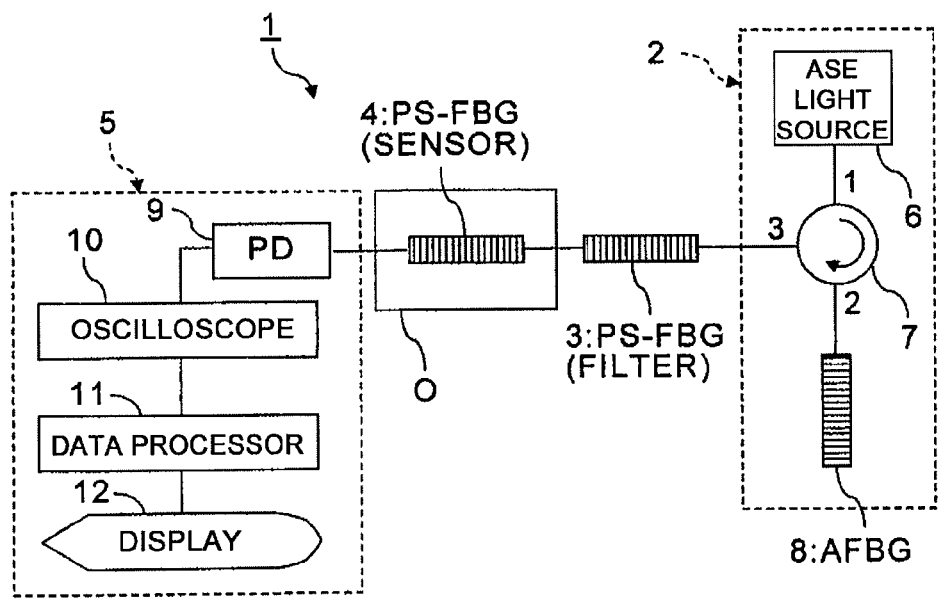
FIG. 1 is a diagram depicting a configuration of a displacement measuring device according to a first embodiment of the present invention.

FIG. 1 is a diagram depicting a displacement measuring device according to a first embodiment of the present invention.

A displacement measuring device 1 measures a displacement amount of an object O constituted by a desired material, such as metal (e.g. aluminum) and a composite material (e.g. carbon fiber reinforced plastic (CFRP)). The displacement measuring device 1 is capable of measuring a micro-displacement generated on an object O by vibration due to ultrasound or by acoustic emission (AE).

AE is a phenomenon generated when a material is deformed or a material is cracked, where strain energy stored in the material is released as an elastic wave. The vibration generated due to ultrasound changes depending on whether a defect exists in the material. Accordingly, the displacement measuring device 1 can be used as a damage inspection equipment of an object O.

The displacement measuring device 1 can be comprised of an irradiation system 2, a first FBG 3, a second FBG 4 and a detecting system 5. Specifically, the first FBG 3 and the second FBG 4 are disposed in a series between the irradiation system 2 and the detecting system 5. The second FBG 4 is installed in an object O, so that the vibration generated in the object O propagates to the second FBG 4. In terms of propagating vibration well, it is preferable to secure the second FBG 4 to the object O by adhesive or glue.

The irradiation system 2 irradiates the irradiation light onto the first FBG 3 and the second FBG 4. Therefore, as illustrated in FIG. 1, the irradiation system 2 can be configured using a broadband light source, such as an amplified spontaneous emission (ASE) light source 6, as illustrated in FIG. 1.

It is preferable to limit the wavelength band, so that irradiation light having an appropriate spectrum is irradiated from the irradiation system 2. Therefore disposing an apodized FBG (AFBG) 8 via an optical circulator 7 is appropriate. Specifically, the irradiation system 2 can be configured by connecting a port 1 of the optical circulator 7 to the ASE light source 6, a port 2 of the optical circulator 7 to the AFBG 8, and a port 3 of the optical circulator 7 to the first FBG 3 respectively.

Then the AFBG 8 functions as an optical element for adjusting a wavelength band of the irradiation light that enters the first FBG 3 and the second FBG 4. In other words, the irradiation light emitted from the ASE light source 6 enters the port 1 of the optical circulator 7, and enters the AFBG 8 through the port 2. As a result, light having an appropriate spectrum is reflected from the AFBG 8 in which optimum characteristics have been provided in advance. Then the reflected light having an appropriate spectrum from the AFBG 8 can enter the port 2 of the optical circulator 7, and can be outputted from the port 3 to the first FBG 3 as the irradiation light.

The first FBG 3 functions as an optical filter. The second FBG 4, on the other hand, functions as an optical sensor. It is preferable that at least either one of the first FBG 3 and the second FBG 4 is constituted by a phase-shifted FBG (PS-FBG). FIG. 1 is an example when both the first FBG 3 and the second FBG 4 are constituted by a PS-FBG. In other words, in the displacement measuring device 1 in FIG. 1, the PS-FBG filter is disposed as the first FBG 3, and the PS-FBG sensor is disposed as the second FBG 4.

Figure 2:
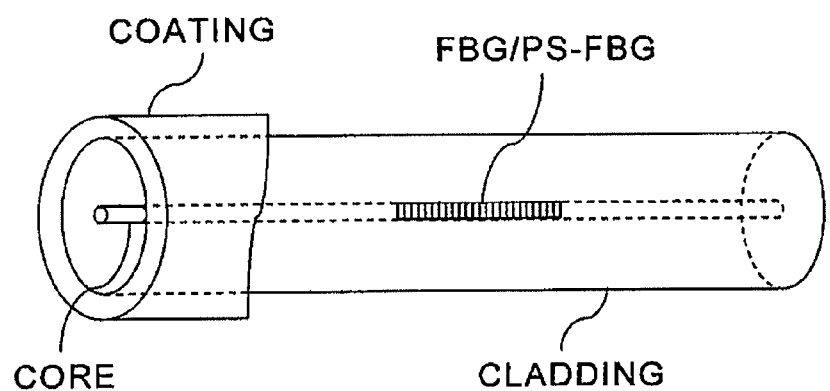
FIG. 2 is a diagram depicting a peripheral structure of FBG and PS-FBG.

FIG. 2 is a diagram depicting a peripheral structure of the FBG and the PS-FBG. As illustrated in FIG. 2, the FBG and the PS-FBG are disposed on a core of a fiber protected by coating and cladding.

Figure 3:
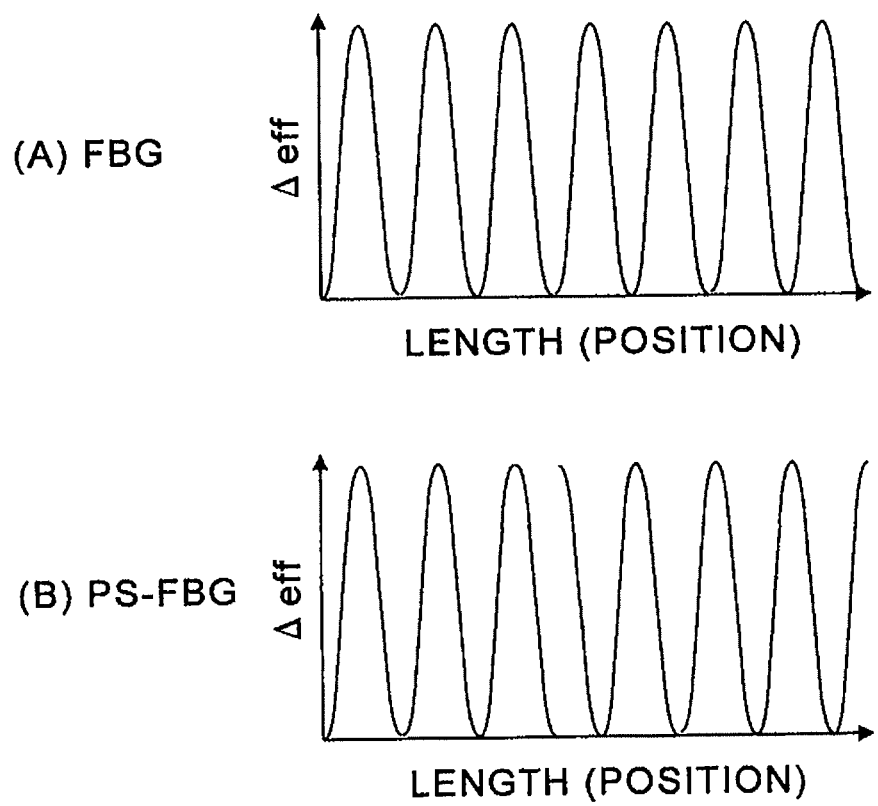
FIGS. 3(A) and 3(B) are diagrams depicting refractive index distribution of FBG and PS-FBG in the longitudinal direction.
Figure 4:
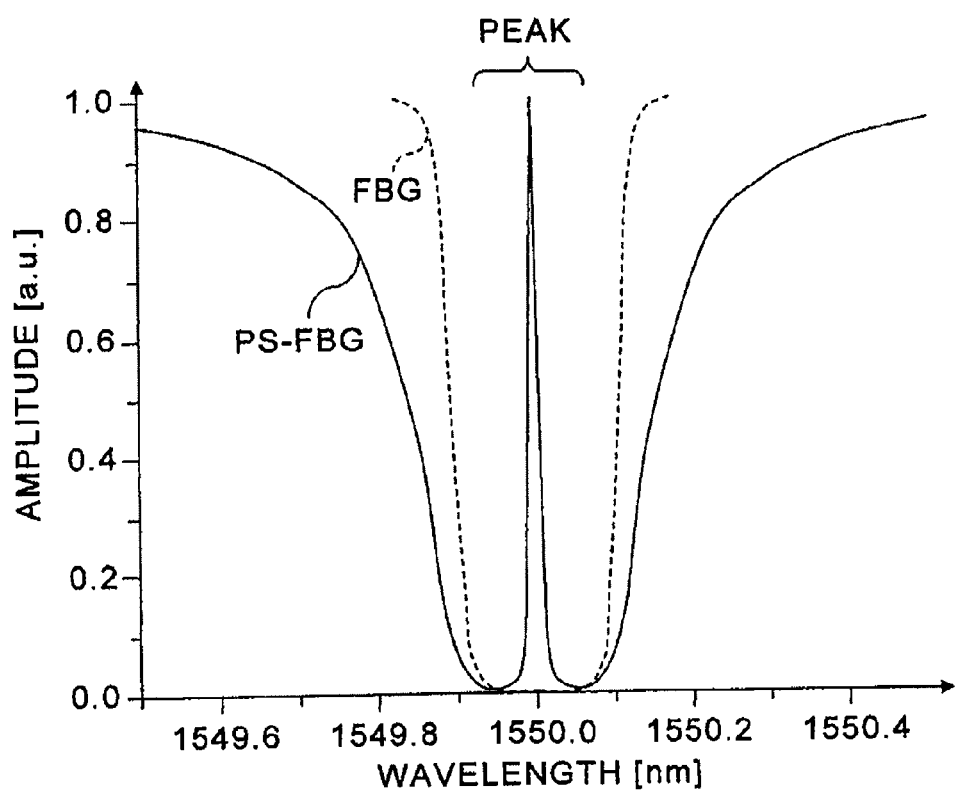
FIG. 4 is a graph depicting spectra of FBG and PS-FBG.

FIGS. 3(A) and 3(B) are diagrams depicting refractive index distribution of the FBG and the PS-FBG in the longitudinal direction, and FIG. 4 is a graph depicting spectra of the FBG and the PS-FBG.

In FIG. 3(A) and FIG. 3(B), each abscissa indicates the length of the optical fiber, on which the FBG and the PS-FBG are disposed, from a reference position, that is a position in the longitudinal direction, and each ordinate indicates an effective refractive index distribution Δeff of the optical fiber on which the FBG and the PS-FBG are disposed. FIG. 3(A) indicates the effective refractive index distribution Δeff of the FBG, and FIG. 3(B) indicates the effective refractive index distribution Δeff of the PS-FBG. In FIG. 4 the abscissa indicates the wavelength [nm] of the transmitted light of the PS-FBG, and the ordinate indicates the intensity [arbitrary unit (a.u)] of the transmitted light of the PS-FBG. A solid line in FIG. 4 indicates a spectrum of the transmitted light of the PS-FBG, and a dotted line indicates a spectrum of the transmitted light of a conventional FBG.

FBG is a diffraction grating of which refractive index periodically changes as illustrated in FIG. 3(A). A spectrum of the FBG having this refractive index distribution has a predetermined distribution in the wavelength direction as indicated in a dotted line in FIG. 4. The PS-FBG, on the other hand, is an FBG where a local phase shift is introduced to a periodic change of the refractive index, as illustrated in FIG. 3(B). In the spectrum of the PS-FBG having the refractive index distribution, a discontinuous peak as indicated by the solid line in FIG. 4 appears in addition to the predetermined distribution of the FBG.

In other words, as illustrated in FIG. 4, a local sharp peak, which does not exist in the spectrum of the transmitted light of the conventional FBG, appears in the spectrum of the transmitted light of the PS-FBG. In the example illustrated in FIG. 4, a peak of which the bandwidth is 0.2 nm or less has been generated. The solid line in FIG. 4 indicates an example when the phase shift amount of the refractive index is 180°.

Figure 5:
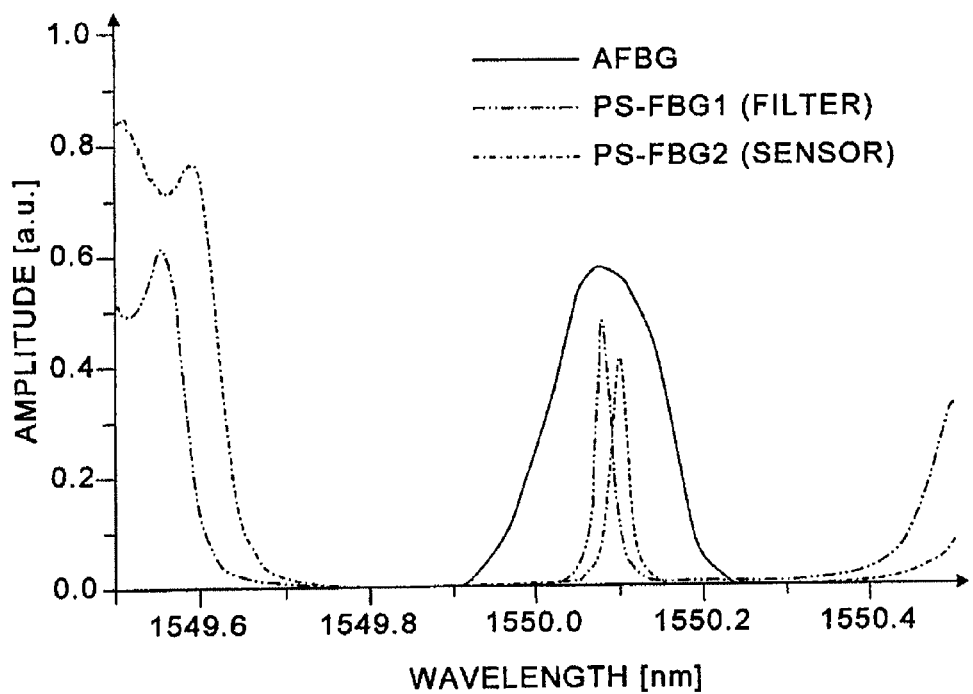
FIG. 5 is a graph depicting examples of a spectrum of reflected light of AFBG, a spectrum of transmitted light of a PS-FBG filter as a first FBG, and a spectrum of transmitted light of a PS-FBG sensor as a second FBG, depicted in FIG. 1.

FIG. 5 is a diagram depicting an example of a spectrum of the reflected light of the AFBG 8, a spectrum of the transmitted light of the PS-FBG filter as the first FBG 3, and a spectrum of the transmitted light of the PS-FBG sensor as the second FBG 4 illustrated in FIG. 1.

In FIG. 5, the abscissa indicates a wavelength [nm] of the reflected light or the transmitted light, and the ordinate indicates an intensity [a.u.] of the reflected light or the transmitted light. The solid line in FIG. 5 indicates the spectrum of the reflected light of the AFBG 8, the two-dot chain line indicates the spectrum of the transmitted light of the PS-FBG filter, and the dashed line indicates the spectrum of the PS-FBG sensor respectively.

The characteristic of AFBG 8 is determined so that the reflective index distribution with respect to the wavelength of the reflected light indicated by the solid line is acquired. The characteristic of the PS-FBG filter is determined so that the first transmittance distribution with respect to the wavelength of the transmitted light indicated by the two-dot chain line is acquired. Further, the characteristic of the PS-FBG sensor is determined so that the second transmittance distribution with respect to the wavelength of the transmitted light indicated by the dashed line is acquired.

Specifically, the optical transmission characteristics of the PS-FBG filter and the PS-FBG sensor are determined so that the first transmittance distribution of the PS-FBG filter and the second transmittance distribution of the PS-FBG sensor overlap. The optical reflection characteristic of the AFBG 8 is determined so that the reflectance distribution of the AFBG 8 covers the first transmittance distribution of the PS-FBG filter and the second transmittance distribution of the PS-FBG sensor.

Then the PS-FBG filter as the first FBG 3 is disposed in a position where the vibration generated in the object O does not propagate, hence the first transmittance distribution of the first FBG 3 is constant regardless of the displacement amount of the object O. Therefore the PS-FBG as the first FBG 3 constitutes an optical filter that selectively outputs only the irradiation light having a wavelength corresponding to the first transmittance distribution, out of the irradiation light entered from the irradiation system 2, to the PS-FBG as the second FBG 4.

The PS-FBG as the second FBG 4, on the other hand, is disposed so that the vibration generated in the object O propagates. Therefore if vibration is applied to the object O and displacement is generated due to strain, the PS-FBG as the second FBG 4 expands/contracts along with the object O. As a result, the transmission characteristic of the PS-FBG as the second FBG 4 changes according to the amount of expansion/contraction of the object O and the second FBG 4. In other words, the second transmittance distribution of the PS-FBG as the second FBG 4 changes in the wavelength direction according to the displacement amount of the object O. Therefore the PS-FBG as the second FBG 4 constitutes an optical sensor that selectively outputs only light, having a wavelength corresponding to the second transmittance distribution that changes according to the displacement amount of the object O, to the detecting system 5.

In this way, when the optical system constituted by the PS-FBG filter and the PS-FBG sensor is disposed on the optical path of the irradiation light, the light having amplitude according to the displacement amount generated in the object O is outputted from the PS-FBG sensor.

FIGS. 6(A) to 6(C) are diagrams depicting the change of amplitude according to the displacement amount of the object O, of the transmitted light that transmits the PS-FBG filter as the first FBG 3 and the PS-FBG sensor as the second FBG 4 as illustrated in FIG. 1.

In FIGS. 6(A) to 6(C), the two-dot chain line indicates the spectrum of the transmitted light of the PS-FBG filter, the dashed line indicates the spectrum of the transmitted light of the PS-FBG sensor, and the solid line indicates the spectrum of the transmitted light that transmitted through the PS-FBG filter and the PS-FBG sensor respectively. To simplify the description, the peak of the spectrum corresponding to the PS-FBG sensor and the peak of the spectrum corresponding to the PS-FBG filter are displayed at the same height.

As illustrated in FIG. 6(A), the transmitted light characteristics of the PS-FBG filter and the PS-FBG sensor are determined so that the spectrum of the PS-FBG filter and the spectrum of the PS-FBG sensor overlap in a state of shifting from each other by the wavelength shift amount $\lambda_0$, when the displacement amount D generated in the object O is zero. Initial conditions when the wavelength shift amount $\lambda_0$ is zero and the displacement D generated in the object O is zero may be set so that the spectrum of the PS-FBG filter and the spectrum of the PS-FBG sensor are not shifted. The wavelength shift amount $\lambda_0$ may be a negative value.

In this case, the spectrum of the transmitted light that transmits through the PS-FBG filter and the PS-FBG sensor is a spectrum corresponding to an overlapped area of the spectrum of the PS-FBG filter and the spectrum of the PS-FBG sensor. Therefore if the transmitted light that transmits through the PS-FBG filter and the PS-FBG sensor is detected as an optical signal, a signal with amplitude $I_0$ is detected.

If the object O displaces by the displacement amount $D_1$, then the PS-FBG sensor also displaces by the displacement amount $D_1$. Therefore as illustrated in FIG. 6(B), the spectrum of the PS-FBG sensor shifts in the wavelength direction. However the PS-FBG filter does not displace, so the spectrum of the PS-FBG filter is constant. As a result, the wavelength shift amount between the spectrum of the PS-FBG sensor and the spectrum of the PS-FBG filter changes to $\lambda 1$. Hence the overlapping area of the spectrum of the PS-FBG filter and the spectrum of the PS-FBG sensor changes, and the amplitude of the transmitted light that transmits through the PS-FBG filter and the PS-FBG sensor becomes amplitude $I_1$ that corresponds to the displacement amount $D_1$ of the object O and the PS-FBG sensor.

In the same manner, if the object O displaces by the display amount $D_2$, the amplitude of the transmitted light that transmits through the PS-FBG filter and the PS-FBG sensor becomes amplitude $I_2$ that corresponds to the displacement amount $D_2$ of the object O and the PS-FBG sensor.

Therefore light having the amplitude I corresponding to the displacement D of the object O is outputted as the measuring light from the PS-FBG sensor. The shift direction of the spectrum of the PS-FBG filter changes depending on whether the PS-FBG sensor contracts or expands. Hence if the object O vibrates, the PS-FBG sensor expands/contracts, and the measuring light having a vibrating intensity in time between a positive value amplitude and a negative value amplitude is outputted from the PS-FBG sensor.

By the AFBG 8 limiting the light quantity and the wavelength of the irradiation light that enters the PS-FBG filter, components of the irradiation light that is unnecessary for measuring the displacement $D_2$ of the object O can be removed. In other words, the AFBG 8 functions as a filter to condense the irradiation light from the ASE light source 6. Therefore the negative influence caused by irradiation light of which intensity is too high can be controlled.

The detecting system 5 acquires an index to indicate a displacement amount of an object O by detecting the amplitude (intensity) of the irradiation light that transmitted through the PS-FBG filter as the first FBG 3 and the PS-FBG sensor as the second FBG 4. In concrete terms, the detecting system 5 can detect the amplitude of the irradiation light that has passed through the second FBG 4 of which the second transmittance distribution changes in the wavelength direction according to the displacement amount of the object O, and the first FBG 4 of which the first transmittance distribution is constant regardless of the displacement amount of the object O, and acquire an index to indicate the displacement amount of the object O based on the amplitude of the irradiation light that changes according to the change amount of the second transmittance distribution. Hence the detecting system 5 can be configured by a photodetector (PD) 9, an oscilloscope 10, a data processor 11 and a display 12.

The PD 9 detects the amplitude of the irradiation light that transmitted through the PS-FBG filter as the first FBG 3 and the PS-FBG sensor as the second FBG 4, and converts the amplitude into an electric signal having an amplitude corresponding to the amplitude of the irradiation light.

The oscilloscope 10 monitors the time-based change of the electric signal detected by the PD 9. Recent oscilloscopes, including digital oscilloscopes, normally have a function to record the time-based change of an electric signal.

The data processor 11 acquires an index to indicate the displacement amount of the object O based on the time-based change of the electronic signal observed in the oscilloscope 10. The data processor 11 can be configured by a computer reading a data processing program having the necessary data processing functions. A circuit may be used to configure the data processor 11 instead. If the oscilloscope 10 is an analog type and the data processor 11 is a computer, then the computer is connected to the oscilloscope 10 via an analog to digital (A/D) convertor.

The index to indicate the displacement amount of the object O may be an amplitude value of an optical or electric signal corresponding to the displacement amount, instead of the displacement amount itself. Hence if the time-based change of the displacement amount of the object O is simply displayed as a waveform to indicate the time-based change of the electric signal, then the data processor 11 can be omitted.

On the other hand, if the displacement amount of the object O is displayed as a numeric value, or if the time-based change of the electric signal is converted into the displacement amount of the object O and this displacement amount is displayed, then a conversion table in which the displacement amount of the object O and the amplitude value of the electric signal are corresponded, or a function to calculate the displacement amount of the object O based on the amplitude value of the electric signal are stored in the data processor 11 in advance. The data processor 11, in this case, includes a function to determine the displacement of the object O based on the electric signal acquired from the oscilloscope 10, with reference to the conversion table or the function for conversion.

The index to indicate the displacement amount of the object O is not limited to the displacement amount or the time-based change of the signal, but may be such information as the presence of a defect or a detection result. For example, in the case of using the displacement measuring device 1 as a damage inspector of an object O, the presence of an AE may be detected as the index to indicate the displacement amount of the object O. In this case, the data processor 11 acquires an index to indicate the displacement amount corresponding to the AE generated in the object O. In other words, in the data processor 11, at least the displacement amount due to the generation of the AE and conversion information, such as a conversion table with the amplitude of the electric signal and the conversion function, are stored. If the amplitude of an electric signal corresponding to the displacement amount due to an AE is detected, the detection information on the generation of the AE can be generated.

As another example, the displacement measuring device 1 may be used as a receiving system of an ultrasonic inspection. In this case, the data processor 11 is provided with a function to detect amplitude or an amplitude pattern of an electric signal corresponding to vibration due to a reflected ultrasonic wave generated when a defect exists in the object O. In other words, the data processor 11 acquires an index to indicate the displacement amount corresponding to the vibration due to an ultrasound according to the structure of the object O. Therefore the conversion information between the ultrasonic vibration and the electric signal according to the structure of a defect or the like of the object O may be stored in the data processor 11.

As another aspect, the data processor 11 may include a defect detecting function according to the material of an object O. The inspection of CFRP, in particular, is an important operation in an aircraft manufacturing site. Therefore in the data processor 11, a defect in an object O constituted by CFRP may be detected as an index. In this case, amplitude or an amplitude pattern of an electric signal corresponding to an AE generated when a defect is generated in CFRP is stored in the data processor 11 as reference data, and the generation of an AE in CFRP is detected based on the reference data and the actually measured electric signal. Or when the ultrasonic inspection is performed on CFRP, amplitude or an amplitude pattern of an electric signal corresponding to the ultrasonic vibration generated in response to the presence of a defect in CFRP is stored in the data processor 11 as reference data, and the presence of a defect in CFRP is detected based on the reference data and the actually measured electric signal.

A defect can be detected similarly for a material other than CFRP. The displacement measuring device 1 can be used not only for detecting a defect, but also as a receiving system in ultrasonic inspection, such as measuring the thickness of an object O. Therefore by providing conversion information and reference data according to the application of the displacement measuring device 1 for the data processor 11, various inspections can be performed on a great variety of objects O, or an optimum displacement measuring device 1 for a specific inspection of a specific object O can be constructed.

The information acquired by the data processor 11 can be displayed on the display 12 as measurement information.

The data processor 11 may include an averaging function for a case when an index to indicate the displacement amount of an object O cannot be acquired with sufficient accuracy by the time-based change of an electric signal acquired by the oscilloscope 10. In other words, when data can be repeatedly acquired under the same conditions, as in a case of applying ultrasonic vibration continuously onto the object O, SNR can be secured by adding the acquired data.

(Operation and Action)

The operation and action of the displacement measuring device 1 will now be described.

To measure the displacement of an object O using the displacement measuring device 1, the PS-FBG sensor as the second FBG 4 is installed in the object O. Then irradiation light is outputted from the ASE light source 6 to the port 1 of the optical circulator 7. Therefore the irradiation light enters from the port 2 of the optical circulator 7 to the AFBG 8. As a result, reflected light having the spectrum indicated by the solid line in FIG. 5 is generated from the AFBG 8.

The reflected light generated in the AFBG 8 enters the port 2 of the optical circulator 7. The reflected light of the AFBG 8 is outputted, as irradiation light, from the port 3 of the optical circulator 7 to the PS-FBG filter as the first FBG 3.

The PS-FBG filter has a transmission characteristic indicated by the two-dot chain line in FIG. 5. Therefore the light having a spectrum that has a sharp peak transmits through the PS-FBG filter. The transmitted light of the PS-FBG filter enters the PS-FBG sensor as the second FBG 4. The PS-FBG sensor also has a transmission characteristic that has a sharp peak indicated by the dashed line in FIG. 5.

If the object O is displaced due to vibration or the like, the PS-FBG sensor expands/contracts together with the object O. As a result, the transmittance distribution of the PS-FBG sensor shifts by a wavelength according to the amount of expansion/contraction of the PS-FBG sensor. Thereby the overlapping area of the first transmittance distribution of the PS-FBG filter and the second transmittance distribution of the PS-FBG sensor changes according to the expansion/contraction of the PS-FBG sensor.

Figure 6:
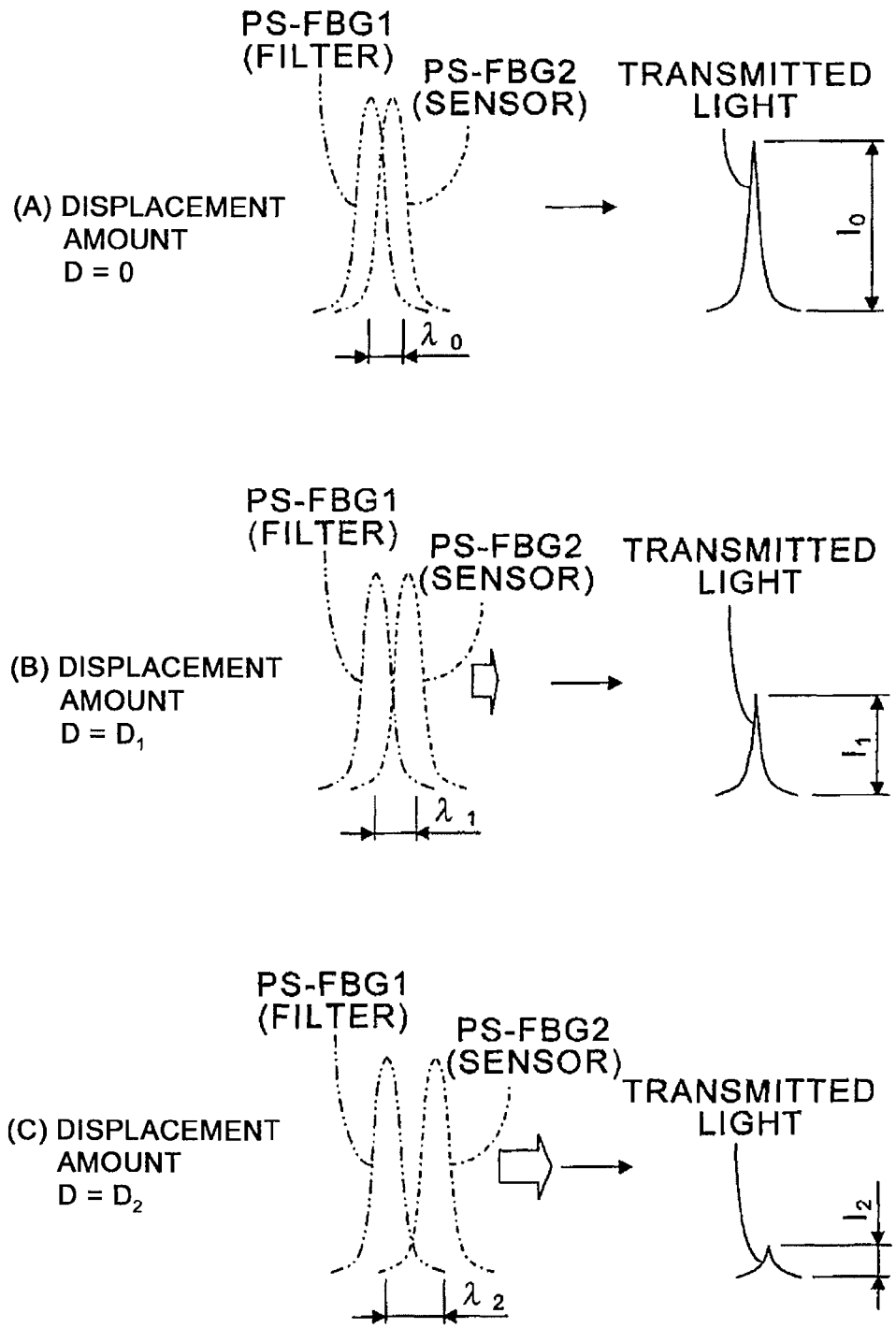
FIGS. 6(A) to 6(C) are diagrams depicting a change of amplitude of transmitted light passing through the PS-FBG filter as the first FBG and the PS-FBG sensor as the second FBG illustrated in FIG. 1 according to a displacement amount of an object.

From the PS-FBG sensor, the irradiation light having a spectrum corresponding to the overlapping area of the first transmittance distribution of the PS-FBG filter and the second transmittance distribution of the PS-FBG sensor is outputted as measured light. In other words, the measured light that has an amplitude corresponding to the displacement amount of the object O and the PS-FBG sensor is outputted from the PS-FBG sensor, as illustrated in FIG. 6.

The measured light outputted from the PS-FBG sensor is detected by the PD 9. In other words, the measured light is converted into an electric signal, which has an amplitude based on the amplitude of the measured light, by the PD 9. The electric signal generated by the PD 9 is outputted to the oscilloscope 10. As a result, the waveform of the electric signal having an amplitude corresponding to the displacement amount of the object O and the PS-FBG sensor is displayed on the oscilloscope 10.

Therefore the user can visually recognize the time-based change of the displacement of the object O as a waveform of an electric signal. For example, when ultrasonic vibration is applied to the object O, the time-based change of micro-displacement caused by the ultrasonic vibration can be observed. When vibration, due to an AE for example, is generated from the object O, the time-based change of the displacement generated along with the micro-displacement caused by the vibration can be observed.

The time-based change of the electric signal acquired by the oscilloscope 10 is outputted to the data processor 11. The data processor 11 executes desired signal processing based on the time-based change of the electric signal. For example, the actual displacement amount of the object O can be calculated by referring to the provided conversion information between the amplitude of the electric signal and the displacement amount of the object O.

Further, an AE generated in the object O or a presence of a defect in the object O can be detected by comparing a pattern of a time-based change of the electric signal and the reference pattern provided based on experience, simulation or the like. If an absolute value of an amplitude of the electric signal that is observed when an AE or a defect exists is provided in advance as reference data, then the AE or the defect can be detected by comparing the absolute value of the amplitude of the electric signal acquired by the oscilloscope 10 with the reference data.

The information acquired by the data processor 11 is displayed on the display 12 as measured information. Hence the user can confirm the information of the object O based not only on the waveform information of the electric signal displayed on the oscilloscope 10, but also on the information of the object O based on the waveform information.

In other words, the displacement measuring device 1 includes a filter and a sensor constituted by FBGs, and determines the displacement amount of the object O by measuring an amplitude of measured light that transmitted through both the optical sensor, of which transmission characteristic changes according to the displacement amount of the object O, and the optical filter, of which transmission characteristic does not change according to the displacement amount of the object O. Furthermore, the displacement measuring device 1 uses a PS-FBG for one or both FBGs constituting the filter and the sensor, so that the change amount of the amplitude of the measured light according to the displacement amount of the object O increases.

The first FBG 3 constituting the filter may be connected to the output side of the second FBG 4 constituting the sensor. In other words, the connection sequence of the first FBG 3 and the second FBG 4, which are the filter and the sensor, is arbitrary.

Effect

According to the displacement measuring device 1, configuration can be simplified compared with the conventional measuring device constituted by such complicated optical elements as AWG. Further, manufacturing cost can be reduced since such an expensive device as a wavelength variable laser is unnecessary. Furthermore, the weight of the displacement measuring device 1 can be decreased. As a result, multi-point measurement can be easily implemented by disposing a plurality of sensors at different locations.

Moreover, constituting at least one of the filter and the sensor by the PS-FBG can make the profile of the spectrum of the transmitted light that transmits at least one of the filter and the sensor very sharp. Further, the light measured by the displacement measuring device 1 is measured light that transmitted through both the filter and the sensor. Therefore even if the displacement amount generated in the object O is minute, this amount can be detected as the amplitude change of the measured light with high sensitivity. In other words, constituting at least one of the filter and the sensor by the PS-FBG can improve sensitivity to detect the microscopic displacement of the object O.

SNR improves if the sensitivity to detect the displacement amount of the object O is improved. Therefore a technique to improve SNR, such as averaging, is not required. This also means that a number of times of observation required for averaging can be decreased. As a result, the time for measuring the displacement amount of the object O can be decreased.

As an actual example, the micro-vibration applied to the object O using lead zirconate titanate (PZT) for a piezoelectric element, and a signal measured by the displacement measuring device 1 including the PS-FBG sensor and the PS-FBG filter and a signal measured by PZT, were compared. As a result, it was confirmed that the displacement measuring device 1 can detect vibration at an accuracy equivalent to PZT.

Furthermore, as a result of applying the vibration to the CFRP using a macro fiber composite (MFC) actuator, which is a piezoelectric actuator, it was confirmed that the displacement measuring device 1, including the PS-FBG sensor and the PS-FBG filter, can detect a Lamb wave that propagates through the CFRP without executing averaging. In order to detect an equivalent Lamb wave using a conventional measuring device constituted by AWG, averaging, which involves approximately 4000 times of data collection, is required. Therefore it is confirmed that the measuring time can be decreased by improving sensitivity using the displacement measuring device 1.

Second Embodiment

Figure 7:
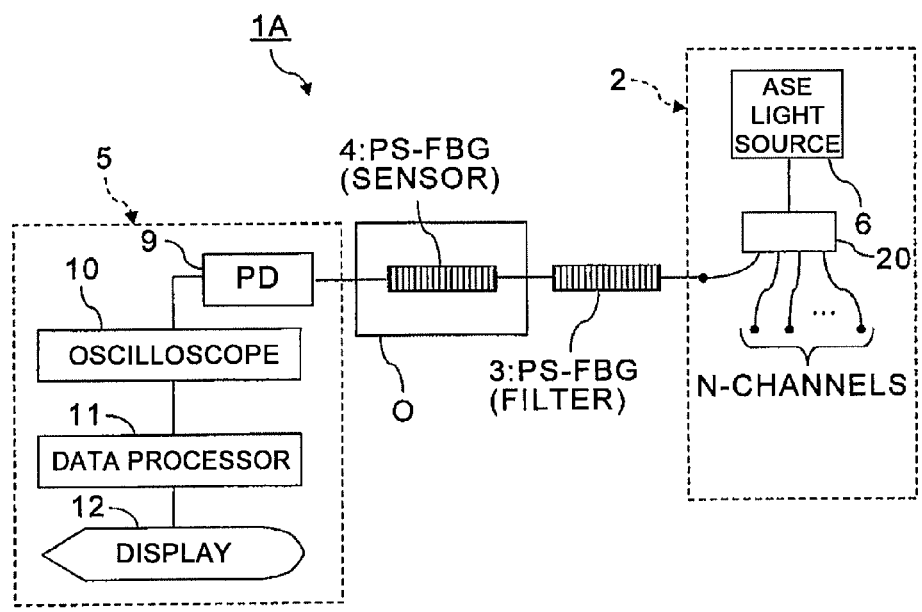
FIG. 7 is a diagram depicting a configuration of a displacement measuring device according to a second embodiment of the present invention.

FIG. 7 is a diagram depicting a displacement measuring device according to a second embodiment of the present invention.

The difference of a displacement measuring device 1A according to the second embodiment illustrated in FIG. 7 from the displacement measuring device 1 according to the first embodiment illustrated in FIG. 1 is the configuration of the irradiation system 2. The other configurations and functions are substantially the same as the displacement measuring device 1 according to the first embodiment, therefore the same composing elements are denoted with a same reference symbol, and redundant description thereof is omitted.

In the irradiation system 2 of the displacement measuring device 1A, an AWG 20 having N channels is disposed as an output destination of the ASE light source 6. The output side of the AWG 20 is connected to the first FBG 3. The characteristic of the AWG 20 is equivalent to the characteristic of the AFBG 8. Therefore the irradiation system 2 of the displacement measuring device 1A can output the irradiation light having a spectrum that is substantially the same as the spectrum of the irradiation light outputted from the irradiation system 2 of the first embodiment including the AFBG 8.

In other words, the displacement measuring device 1A according to the second embodiment uses the AWG 20 as an optical element to adjust the wavelength band of the irradiation light that enters the first FBG 3 and the second FBG 4. Therefore the displacement measuring device 1A of the second embodiment can implement an effect similar to the displacement measuring device 1 of the first embodiment.

Third Embodiment

Figure 8:
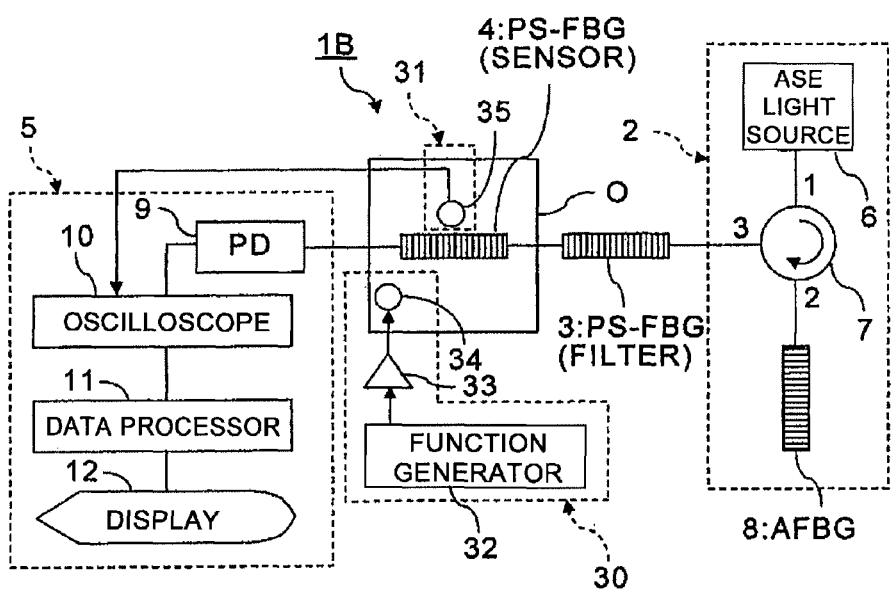
FIG. 8 is a diagram depicting a configuration of a displacement measuring device according to a third embodiment of the present invention.

FIG. 8 is a diagram depicting a displacement measuring device according to a third embodiment of the present invention.

The difference of a displacement measuring device 1B according to the third embodiment illustrated in FIG. 8 from the displacement measuring device 1 according to the first embodiment illustrated in FIG. 1 is an ultrasonic transmitting system 30 and an ultrasonic receiving system 31 which are disposed in the displacement measuring device 1B, and the functions of the detecting system 5. The other configurations and functions are substantially the same as the displacement measuring device 1 according to the first embodiment, therefore the same composing elements are denoted with a same reference symbol, and redundant description thereof is omitted.

The ultrasonic transmitting system 30 applies vibration to an object O using ultrasound. The ultrasonic transmitting system 30 can be configured by connecting a piezoelectric element 34, such as PZT, to an output side of a function generator 32 via an amplifier 33.

The ultrasonic receiving system 31 is a system to receive an ultrasound that propagates through the object O. The ultrasonic receiving system 31 can be configured using a piezoelectric element 35, such as PZT. A detector, such as an oscilloscope, can be used to detect output from the piezoelectric element 35. In the example in FIG. 8, an oscilloscope 10, for monitoring the output of the PD 9, is also used as a detector of the ultrasonic receiving system 31.

In other words, the displacement measuring device 1B includes the ultrasonic transmitting system 30 and the ultrasonic receiving system 31 as additional composing elements. Therefore the detecting system 5 can acquire an index to indicate the displacement amount corresponding to the vibration due to the ultrasound according to the structure of the object O.

The displacement measuring device 1B includes the ultrasonic receiving system 31. This allows comparing an ultrasonic signal received by the piezoelectric element 35 of the ultrasonic receiving system 31 and an optical signal received by the PD 9. In other words, the detecting system 5 can perform data processing based on both the optical signal and the ultrasonic signal.

Therefore the displacement measuring device 1B of the third embodiment can implement an effect similar to the displacement measuring device 1 of the first embodiment. Moreover, the vibration generated in the object O can be detected as both the optical signal and the ultrasonic signal. This means that the respective advantages of the optical signal and the ultrasonic signal can be effectively utilized. For example, a signal acquired by one of the piezoelectric elements 35 and the FBG sensor can be used for accuracy confirmation and calibration of the other of the piezoelectric element 35 and the FBG sensor. Post-processing, such as weighting addition, can also be executed for the optical signal and the ultrasonic signal.

Fourth Embodiment

Figure 9:
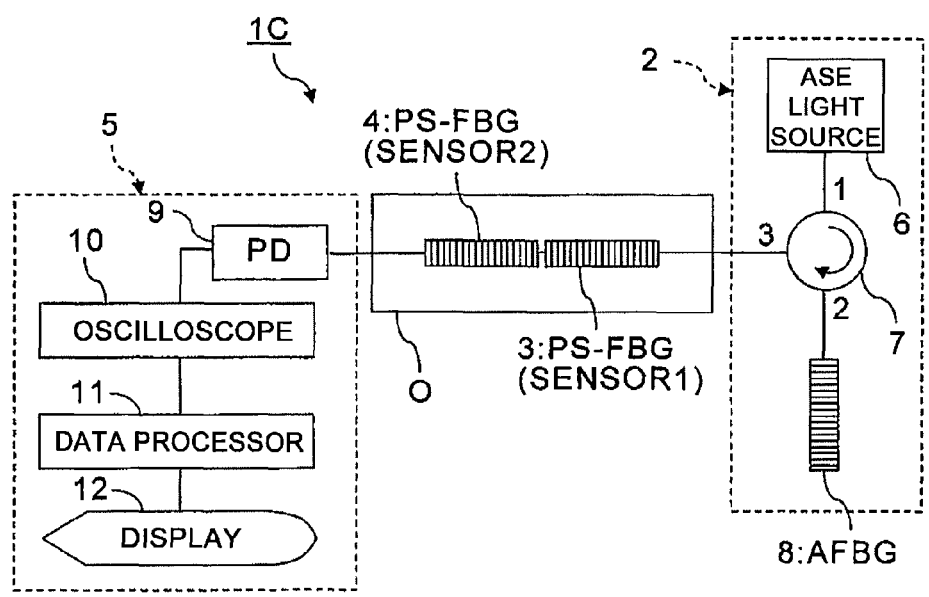
FIG. 9 is a diagram depicting a configuration of a displacement measuring device according to a fourth embodiment of the present invention.

FIG. 9 is a diagram depicting a displacement measuring device according to a fourth embodiment of the present invention.

The difference of a displacement measuring device 1C according to the fourth embodiment illustrated in FIG. 9 from the displacement measuring device 1 according to the first embodiment illustrated in FIG. 1 is disposing both the first FBG 3 and the second FBG 4 as sensors. The other configurations and functions are substantially the same as the displacement measuring device 1 according to the first embodiment, therefore the same composing elements are denoted with a same reference symbol, and redundant description thereof is omitted.

In the displacement measuring device 1C, the first FBG 3 is also installed in an object O as a sensor. In the example illustrated in FIG. 9, the first PS-FBG sensor and the second PS-FBG sensor are installed in the object O as the first FBG 3 and the second FBG 4. In other words, the first FBG 3 constitutes the first sensor of which first reflectance distribution changes in the wavelength direction according to the displacement amount of the object O. In the same way, the second FBG 4 constitutes a second sensor of which the second transmittance distribution changes in the wavelength direction according to the displacement amount of the object O.

Each transmission characteristic of the first FBG 3 and the second FBG 4, however, is determined so that the second transmittance distribution of the second FBG 4 changes in the wavelength direction with a change amount different from that of the first transmittance distribution of the first FBG 3 according to the displacement amount of the object O. In this way the amplitude of the transmitted light that transmits through both the first FBG 3 and the second FBG 4 changes according to the displacement amount of the object O.

FIGS. 10(A) to 10(C) are diagrams depicting a change of amplitude of transmitted light passing through the first PS-FBG sensor as the first FBG 3 and the second PS-FBG sensor as the second FBG 4 illustrated in FIG. 9, according to a displacement amount of an object O.

Figure 10:
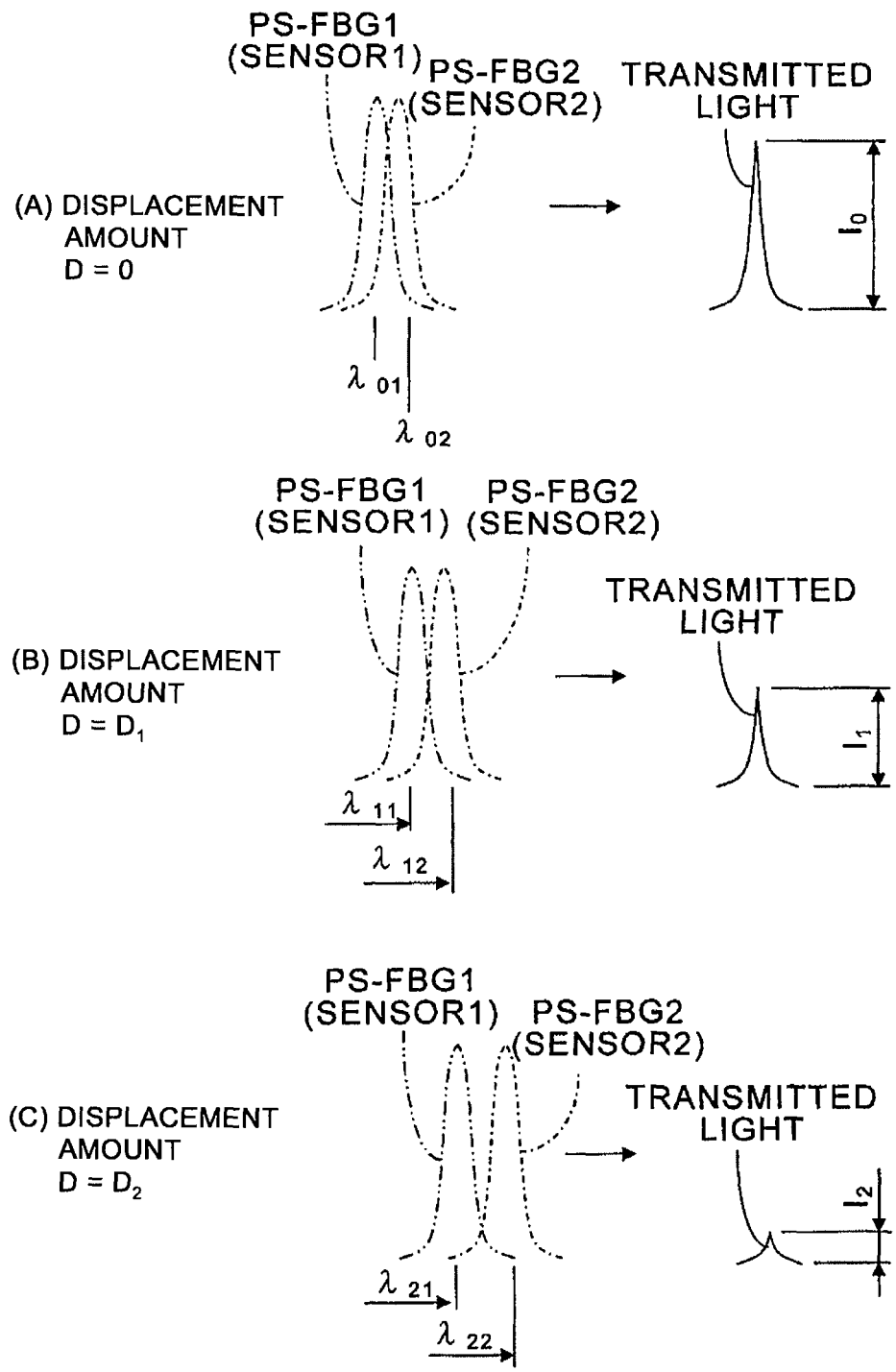
FIGS. 10(A) to 10(C) are diagrams depicting a change of amplitude of transmitted light passing through the first PS-FBG sensor as the first FBG and the second PS-FBG sensor as the second FBG illustrated in FIG. 9, according to a displacement amount of an object.

In FIGS. 10(A) to 10(0), the two-dot chain line indicates a spectrum of the transmitted light of the first PS-FBG sensor, the dashed line indicates a spectrum of the transmitted light of the second PS-FBG sensor, and the solid line indicates a spectrum of the transmitted light that transmitted through the first PS-FBG sensor and the second PS-FBG sensor. To simplify description, the peak of the spectrum corresponding to the first PS-FBG sensor and the peak of the spectrum corresponding to the second PS-FBG sensor are displayed at the same height.

As illustrated in FIG. 10(A), it is assumed that the transmitted light characteristics of the first PS-FBG sensor and the second PS-FBG sensor are determined so that the spectrum of the first PS-FBG sensor and the spectrum of the second PS-FBG sensor overlap when the displacement amount D generated in the object O is zero. The wavelength corresponding to the peak of the spectrum of the first PS-FBG sensor at this time is denoted with $\lambda_{01}$, and the wavelength corresponding to the peak of the spectrum of the second PS-FBG sensor is denoted with $\lambda_{02}$.

In this case, if the transmitted light transmitted through the first PS-FBG sensor and the second PS-FBG sensor is detected as an optical signal, a signal with an amplitude $I_0$ corresponding to the overlapping area is detected.

If the object O is displaced by the displacement amount $D_1$, on the other hand, the wavelength corresponding to the peak of the spectrum of the first PS-FBS sensor is shifted to $\lambda_{11}$, and the wavelength corresponding to the peak of the spectrum of the second PS-FBG sensor is shifted to $\lambda_{12}$ respectively. However the shift amount of the spectrum of the first PS-FBG sensor and the shift amount of the spectrum of the second PS-FBG sensor are different from each other. Therefore the overlapping area of the spectrum of the first PS-FBG sensor and the spectrum of the second PS-FBG sensor changes, and the amplitude of the transmitted light that transmits through the first PS-FBG sensor and the second PS-FBG sensor becomes the amplitude $I_1$ corresponding to the displacement amount $D_1$ of the object O.

In the same manner, if the object O is displaced by the displacement amount $D_2$, the wavelength corresponding to the peak of the spectrum of the first PS-FBG sensor is shifted to $\lambda_{21}$, and the wavelength corresponding to the peak of the spectrum of the second PS-FBG sensor is shifted to $\lambda_{22}$ respectively. Therefore the amplitude of the transmitted light transmitted through the first PS-FBG sensor and the second PS-FBG sensor becomes the amplitude $I_2$ corresponding to the displacement amount $D_2$ of the object O.

As a result, the light having the amplitude I corresponding to the displacement amount D of the object O is outputted, as the measured light, from the second PS-FBG sensor in a subsequent stage. This means that the displacement amount of the object O can be measured based on the same principle as the displacement measuring device 1 of the first embodiment. Both the first FBG 3 and the second FBG 4 have a role of a sensor and a role of a filter.

Therefore the displacement measuring device 1C of the fourth embodiment can implement an effect similar to the displacement measuring device 1 of the first embodiment. Moreover, the measuring range of the displacement amount of the object O can be widened by appropriately determining the characteristic of each FBG sensor. In other words, the measuring sensitivity and the measuring range to measure the displacement amount can be adjusted according to the conditions, such as a material of the object O and an expected range of the displacement amount.

Fifth Embodiment

Figure 11:
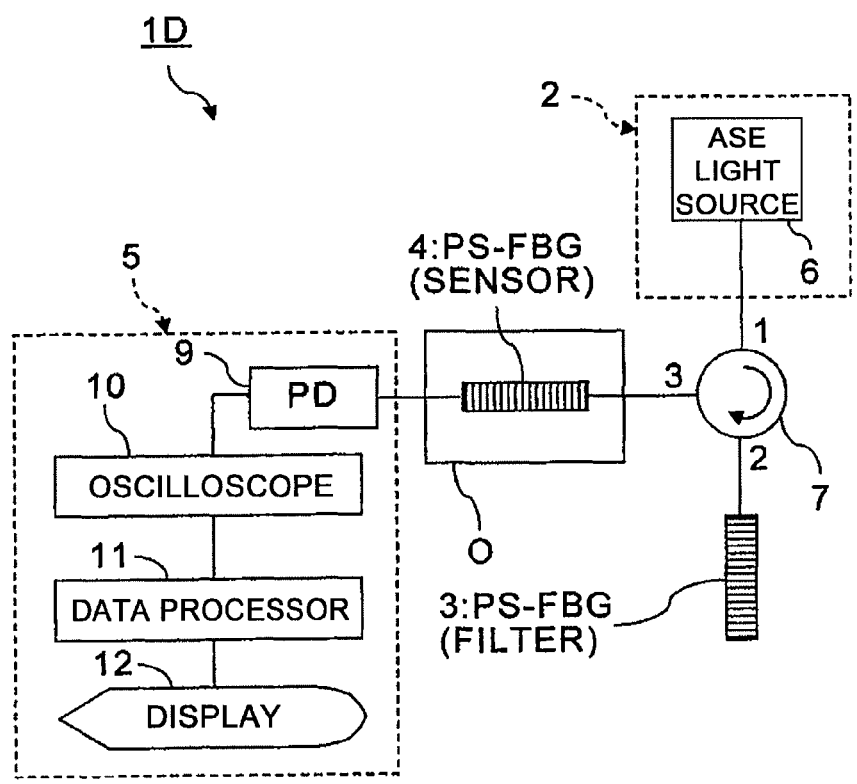
FIG. 11 is a diagram depicting a displacement measuring device according to a fifth embodiment of the present invention.

FIG. 11 is a diagram depicting a displacement measuring device according to a fifth embodiment of the present invention.

The difference of a displacement measuring device 1D according to the fifth embodiment illustrated in FIG. 11 from the displacement measuring device 1 according to the first embodiment illustrated in FIG. 1 is that a reflected light is used instead of at least one of each transmitted light transmits through the first FBG 3 and the second FBG 4. The other configurations and functions are substantially the same as the displacement measuring device 1 according to the first embodiment, therefore the same composing elements are denoted with a same reference symbol, and redundant description thereof is omitted.

In order to allow the measured light having amplitude corresponding to the displacement amount of the object O to enter the PD 9, reflected light can also be used instead of each transmitted light of the first FBG 3 and the second FBG 4. If the reflected light is used, the reflectance distribution with respect to the wavelength of the reflected light of the first FBG 3 and/or the second FBG 4 that generates the reflected light is adjusted.

The displacement measuring device 1D illustrated in FIG. 11 is configured such that the reflected light of the first FBG 3, which functions as a filter, enters the second FBG 4, which functions as a sensor, via the optical circulator 7. Therefore the reflection characteristic of the first FBG 3 is determined so that the spectrum of the reflected light of the first FBG 3 overlaps with the spectrum of the transmitted light of the second FBG 4.

The AFBG 8 is disposed between the ASE light source 6 and the optical circulator 7. In other words, the ASE light source 6 is connected to the port 1 of the optical circulator 7, the first FBG 3 is connected to the port 2, and the second FBG 4 is connected to the port 3 respectively. Therefore the broadband irradiation light outputted from the ASE light source 6 enters the port 1 of the optical circulator 7, and is outputted from the port 2. The irradiation light outputted from the port 2 of the optical circulator 7 enters the PS-FBG filter as the first FBG 3. Then the reflected light, reflected in the first FBG 3, enters the port 2 of the optical circulator 7.

The reflected light from the first FBG 3, which entered the port 2 of the optical circulator 7, is outputted from the port 3 to the second FBG 4 as the irradiation light. Therefore the spectrum of the irradiation light that enters the second FBG 4 becomes a spectrum corresponding to the reflection characteristic of the first FBG 3. This means that the spectrum of the transmitted light that is reflected by the first FBG 3 and transmitted through the second FBG 4 becomes a spectrum corresponding to the overlapping area between the reflectance distribution of the first FBG 3 and the transmittance distribution of the second FBG 4.

Because of this, if the object O is displaced, the transmittance distribution of the second FBG 4 is shifted according to the displacement amount, and the overlapping area between the reflectance distribution of the first FBG 3 and the transmittance distribution of the second FBG 4 changes. As a result, the amplitude of the transmitted light that is reflected by the first FBG 3 and is transmitted through the second FBG 4 becomes an amplitude corresponding to the displacement amount of the object O.

This means that the displacement amount of the object O can be measured based on the same principle as the displacement measuring device 1 of the first embodiment. Therefore the displacement measuring device 1D of the fifth embodiment can implement an effect similar to the displacement measuring device 1 of the first embodiment.

As described in the first embodiment, the sequence of the filter and the sensor is arbitrary. This means that, in FIG. 11, the first FBG 3 may be the FBG sensor, such as the PS-FBG sensor, and the second FBG 4 may be the FBG filter, such as a PS-FBG filter. Since the reflected light can be used instead of the transmitted light, the first FBG 3 and the second FBG 4 may be disposed so that the light, which is transmitted through the first FBG 3 and is reflected by the second FBG 4, enters the PD 9. Further, the first FBG 3 and the second FBG 4 may be disposed so that the light, which is reflected by the first FBG 3 and is also reflected by the second FBG 4, enters the PD 9.

Depending on the method of disposing the first FBG 3 and the second FBG 4, the displacement amount of the object O and the amplitude of the measured light that enters the PD 9 may form a non-linear relationship. In this case, the amplitude of the measured light can be converted into the displacement amount of the object O by providing a conversion table in advance between the displacement amount of the object O and the amplitude of the measured light, which are in a non-linear relationship, based on testing or the like, or by performing fitting using an arbitrary function.

OTHER EMBODIMENTS

While specific embodiments have been described above, such embodiments are merely illustrative, and are not intended to limit the scope of the invention. New methods and devices described above can be carried out in various other modes. And the modes of the methods and devices described here can be omitted, replaced or changed within the scope of not departing from the spirit of the invention. The attached Claims and equivalent thereof are included in the scope and spirit of the invention, and include various modes and modifications.

For example, each embodiment described above can be combined. This means that an optical system of which overlapping area of the spectrum changes according to the displacement amount of the object O can be constructed using the first FBG 3, which has the first transmittance distribution or the first reference distribution with respect to the wavelength of the transmitted light or the reflected light, and the second FBG 4, which has the second transmittance distribution or the second reflectance distribution with respect to the wavelength of the transmitted light or the reflected light. In this case, it is preferable, in terms of improving sensitivity, that the optical system includes at least the PS-FBG of which the transmittance distribution or the reflectance distribution with respect to the wavelength of the transmitted light or the reflected light changes according to the displacement amount of the object O.

In the detecting system 5, the amplitude of the irradiation light that has passed through the first FBG 3 and the second FBG 4, of which at least one of the first transmittance distribution and the second transmittance distribution changes in the wavelength direction with a change amount different from that of the other according to the displacement amount of the object O, may be detected, and an index to indicate the displacement amount of the object O, based on the amplitude that changes according to the change amount of at least one of the first transmittance distribution and the second transmittance distribution, may be acquired. Or the amplitude of the irradiation light that has passed through the first FBG 3 and the second FBG 4, of which one of the first reflectance distribution and the second reflectance distribution changes in the wavelength direction with a change amount different from that of the other according to the displacement amount of the object O, may be detected, and an index to indicate the displacement amount of the object O, based on the amplitude that changes according to the change amount of at least one of the first reflectance distribution and the second reflectance distribution, may be acquired.

The invention claimed is:

1. A displacement measuring device, comprising:
   an irradiation system for irradiating irradiation light;
   a first fiber Bragg grating that has first transmittance distribution or first reflectance distribution with respect to a wavelength of transmitted light or reflected light;
   a second fiber Bragg grating that has second transmittance distribution or second reflectance distribution with respect to a wavelength of transmitted light or reflected light; and
   a detecting system that detects amplitude of the irradiation light that has passed through the first fiber Bragg grating and the second fiber Bragg grating of which at least one of the first transmittance distribution and the second transmittance distribution changes in a wavelength direction with a change amount different from that of the other, according to a displacement amount of an object, or amplitude of the irradiation light that passes through the first fiber Bragg grating and second fiber Bragg grating of which at least one of the first reflectance distribution and the second reflectance distribution changes in the wavelength direction with a change amount different from that of the other, according to the displacement amount of the object, and acquires an index to indicate the displacement amount based on the amplitude that changes according to the change amount of at least one of the first transmittance distribution and the second transmittance distribution, or the change amount of at least one of the first reflectance distribution and the second reflectance distribution.

2. The displacement measuring device according to claim 1, wherein
   at least one of the first fiber Bragg grating and the second fiber Bragg grating is constituted by a phase-shifted fiber Bragg grating.

3. The displacement measuring device according to claim 1, wherein
   the first fiber Bragg grating constitutes a filter of which the first transmittance distribution or the first reflectance distribution is constant regardless of the displacement amount of the object, and the second fiber Bragg grating constitutes a sensor of which the second transmittance distribution or the second reflectance distribution changes in the wavelength direction according to the displacement amount of the object.

4. The displacement measuring device according to claim 1, wherein the first fiber Bragg grating constitutes a first sensor of which the first transmittance distribution or the first reflectance distribution changes in the wavelength direction according to the displacement amount of the object, and the second fiber Bragg grating constitutes a second sensor of which the second transmittance distribution or the second reflectance distribution changes in the wavelength direction with a change amount different from that of the first transmittance distribution or the first reflectance distribution according to the displacement amount of the object.

5. The displacement measuring device according to claim 1, further comprising an ultrasonic transmitting system for adding vibration to the object by ultrasound, wherein the detecting system is configured to acquire an index to indicate a displacement amount corresponding to the vibration caused by the ultrasound according to the structure of the object.

6. The displacement measuring device according to claim 1, wherein the detecting system is configured to acquire an index to indicate a displacement amount corresponding to acoustic emission generated in the object.

7. The displacement measuring device according to claim 1, wherein the detecting system detects, as the index, a defect in an object constituted by carbon-fiber reinforced plastic.

8. The displacement measuring device according to claim 1, further comprising an optical element for adjusting a wavelength band of the irradiation light that enters the first fiber Bragg grating and the second fiber Bragg grating.

9. A displacement measuring device, comprising:

an irradiation system for irradiating irradiation light;

an optical system including at least a phase-shifted fiber Bragg grating of which transmittance distribution or reflectance distribution with respect to a wavelength of transmitted light or reflected light changes according to a displacement amount of an object; and a detecting system that detects amplitude of the irradiation light that has passed through the optical system, and acquires an index to indicate the displacement amount based on the amplitude that changes according to a change amount of the transmittance distribution or the reflectance distribution.

10. A displacement measuring method, comprising the steps of:

irradiating irradiation light onto a first fiber Bragg grating that has first transmittance distribution or first reflectance distribution with respect to a wavelength of transmitted light, and a second fiber Bragg grating that has second transmittance distribution or second reflectance distribution with respect to a wavelength of transmitted light; and detecting amplitude of the irradiation light that has passed through the first fiber Bragg grating and the second fiber Bragg grating of which at least one of the first transmittance distribution and the second transmittance distribution changes in a wavelength direction with a change amount different from that of the other, according to a displacement amount of an object, or amplitude of the irradiation light that has passed through the first fiber Bragg grating and the second fiber Bragg grating of which at least one of the first reflectance distribution and the second reflectance distribution changes in the wavelength direction with a change amount different from that of the other, according to the displacement amount of the object, and acquiring an index to indicate the displacement amount based on the amplitude that changes according to the change amount of at least one of the first transmittance distribution and the second transmittance distribution, or the change amount of at least one of the first reflectance distribution and the second reflectance distribution.

* * * * *